United States Patent [19]

Staver

[11] Patent Number: 5,087,188

[45] Date of Patent: Feb. 11, 1992

[54] DIES FOR FORMING SOAP WITH ATTACHED MEMBER

[76] Inventor: Robert B. Staver, 121 Pepper Dr., Los Altos, Calif. 94022

[21] Appl. No.: 420,659

[22] Filed: Oct. 11, 1989

Related U.S. Application Data

[60] Continuation of Ser. No. 121,948, Nov. 18, 1987, abandoned, which is a division of Ser. No. 722,826, Apr. 12, 1985, abandoned.

[51] Int. Cl.⁵ .................. B29C 43/18; C11D 13/16
[52] U.S. Cl. .............................. 425/116; 249/68; 249/83; 249/98; 425/125; 425/128; 425/355; 425/361; 425/408; 425/415; 425/422; 425/437; 425/444
[58] Field of Search ............ 425/116, 125, 128, 129.1, 425/351, 408, 412, 415, 422, 444, 355, 359, 361, 437, 443; 249/117, 68, 83, 98

[56] References Cited

U.S. PATENT DOCUMENTS

| | | | |
|---|---|---|---|
| 381,438 | 4/1888 | Smith | 425/128 |
| 435,946 | 9/1890 | Ostrom | 425/128 |
| 827,799 | 8/1906 | Grove et al. | 425/128 |
| 3,100,363 | 8/1963 | Staver | 401/6 |
| 3,363,040 | 1/1968 | Aoki | 425/125 |
| 3,587,144 | 6/1971 | Mechling | 425/422 |
| 4,128,370 | 12/1978 | Massa | 425/125 |
| 4,470,786 | 9/1984 | Sano et al. | 425/125 |

FOREIGN PATENT DOCUMENTS

60-244516  12/1985  Japan ................... 425/553

Primary Examiner—James C. Housel

[57] ABSTRACT

A die apparatus for molding and forming a cake of soap with an adapter. Peripheral obturation cleanly and securely attaches the generally horizontal adapter to the upper surface of a body of soap of a size to be manipulated by a hand. The die also includes an ejector for separating the soap adapter combination from the die. Attachment of the adapter to the soap can be accomplished with several types of soap dies such as matrix dies, pin dies, box dies and variations thereof.

6 Claims, 8 Drawing Sheets

DIES FOR FORMING SOAP WITH ATTACHED MEMBER

This application is a continuation of application Ser. No. 121,948, filed Nov. 18, 1987 and now abandoned, which is a division of application Ser. No. 722,826, filed Apr. 12, 1985 and now abandoned.

A cake of soap and member made according to the disclosed state of the art, by means of casting molten soap into a mold containing a member with holding means, whose base portion (adapter) imbedded in the soap is of highly stable dimensions, produces a product sample giving consistently reliable performance. However, this has been found not to be a practical method for the commercial production of a cake of soap in any form. In contrast, sample combinations of a cake of soap and member (portion) made according to the disclosed state of the art, on a Foot Press (which is capable of producing between six to eight such soap cake combinations per minute in a hand operation, which each soap press requiring an individual operator), have been found to suffer from an unacceptably high proportion of product failure due to premature separation of the adapter (portion) from the cake of soap as well as due to other serious imperfections.

Further, said combination cannot be made according to present production practice with presently available soap-dies on presently available high-speed automatic toilet soap presses now employed by the soap industry. This high-speed production of a reliable combination on fully automatic soap presses is essential in order to reduce unit product cost sufficiently so that the combination of the soap and member (portion) may be offered at a retail price level that will be acceptable in the marketplace.

In short, although the disclosed state of prior art defines an article of improved utility to the consumer, which can be rendered with limited success in a hand operation at prohibitive economic cost, such prior art in no way discloses how to successfully produce such an article at low-cost on high-speed, fully automatic production machine and equipment that will provide consistently reliable performance for the consumer. In other words, prior art fails to its objective and thus comprises an imperfect disclosure.

Some problems to be addressed that have contributed to (a) insecure attachment of the member to a body of soap,
(b) difficulty for the consumer to attach the upper separable portion of the member to the adapter-soap combination, and
(c) inability to produce subject combination at low competitive cost with existing production machines and equipment, are as follows:

(1) Problems of obtaining stress-free cooperating separable parts of the member, whose partial dysfunction may destroy product acceptability.
(2) Problem of ascertaining favorable design of member that acts to prevent failure of its attachment to a body of soap.
(3) Problem of ascertaining favorable design of soap-blank that acts to prevent its failure of attachment to member.
(4) Problems of designing a reliable combination that accommodates substantial differential shrinkage of a body of soap throughout its useful life.
(5) Problems of finding favorable design of soap dies for successfully producing said combination in automatic manufacture.
(6) Problem of finding favorable design of soap ejection pin (in soap die) that acts to prevent failure of attachment of a member to a body of soap (that contains several volatile constituents).
(7) Problem of finding a new method for successfully producing said combination in automatic manufacture. (Such method may include both new basic design of soap press as well as new dies and procedures as needed for satisfactory production of a reliable product.)

In view of the foregoing, a general object of the present invention is to provide, in combination, a cake of soap and member of improved design, which member (or a separable "adapter" portion thereof) will remain attached to the body of soap throughout its useful life, and such means as needed, and a method, for the manufacture of said combination at economic cost.

A more specific object of the present invention is to prevent formation of a cavity between and along the major bottom surface of the member and the facing surface of the soap material which, when in intimate contact with each other, together comprise their major "interface".

Another object of the present invention is to provide means for, and a method for attaching a member (portion) to a body of soap in a soap press while at the same time preventing the unwanted migration of soap above the outer flange (or outer edge portion) of said member.

Another object of the present invention is to provide means both (a) for more easily placing an adapter (portion of a member) into intimate contact with a supporting die-protuberance located within a soap die, and (b) for maintaining secure attachment of said adapter to said protuberance during pressing of the combination.

And another object of the present invention is to provide both means for, and a method for, the automatic production of said combination of soap and attached adapter on commercial types of soap presses.

And still a more specific object of the present invention is to provide a practical method of achieving high-speed, low-cost, automatic production of said combination of soap and said adapter.

And another object of the present invention is to provide:

(a) means for maintaining an attachment force between two separable portions of a member, attached to a body of soap, within an acceptable and comfortable range for the consumer, while at the same time
(b) preserving the major buoyancy chamber within said member, both being independent of any and all distortion including shrinkage of the lower portion of the member imparted chiefly by excessive differential shrinkage of the surrounding soap material, as well as by possible shrinkage of the lower separable portion of the member itself.

These, and other object of the present invention will become more clearly evident from the following description when taken in conjunction with the accompanying drawing.

Referring to the drawing.

Figure 1:
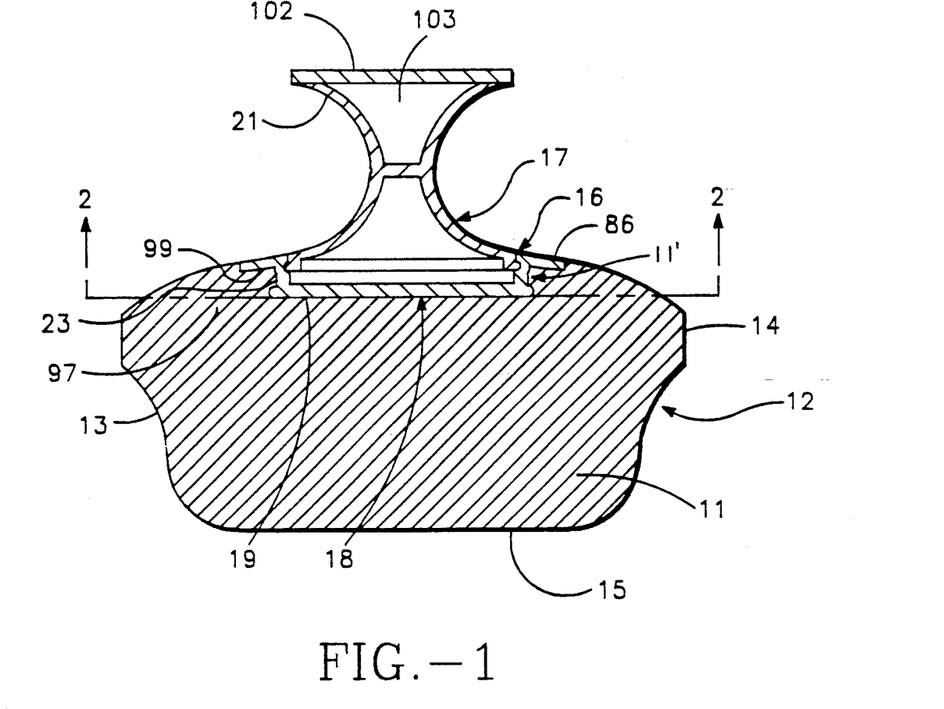
FIG. 1 is an elevation view, in section, showing a cake of soap and member with holding means in accordance with the present invention.
Figure 2:
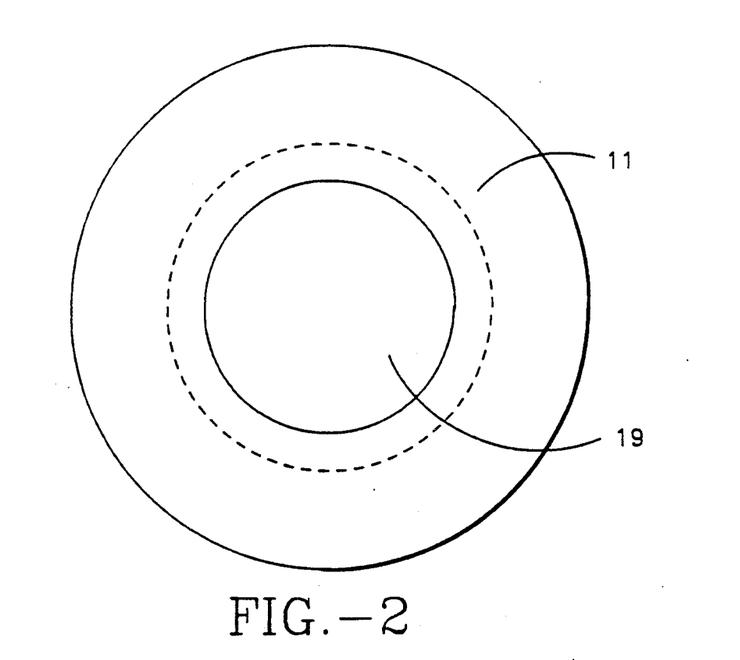
FIG. 2 is a sectional view taken along the line 2—2 of FIG. 1.

Referring to the drawing:

In FIGS. 1 and 2, the cake of erodable material is indicated generally by the reference numeral 11. The cake of material has a side surface 12, which surface is defined (in a preferred embodiment) generally by a surface of revolution. The side-surface 12 shown has an inwardly extending concavity 13 which facilitates grasping and holding the article for use. The upper surface can rest in the palm of the hand and the fingers extend over the outer edge of the rim 14 with the thumb lying along the concavity 13. The material extends up along the edge 23. A surface 15, which may be generally flat or moderately curved, is adapted to operate upon associated objects. Thus, if the material 11 is a cake of soap, the surface 15 is adapted to be applied to the skin, clothes or other objects. The axis of the surface 15 is substantially coincident with the axis of the surface of revolution 12. The opposite surface 16 of the soap cake is adapted to receive a member designated generally by the number 17, which member may include a horizontally extending, separable base (adapter) portion 18 having a finite surface 19 adapted to form intimate contact with the cake of soap 11. The member 17 may include a holding means (handle) such as shown at 21 (and as described more fully in prior art U.S. Pat. No. 3,100,363) which facilitates holding the cake of soap for application to objects. It will become apparent that the member 17 may be made of plastic, wood, metal or other suitable material, or of any combination of same.

The finite surface 19 cooperates with the cake 11 in such a manner that the axial force required to detach the adapter 18 from the cake is substantial. It is believed that the binding or holding force is primarily due to an atmospheric pressure bond between the cake 11 and finite adapter surface 18. That is, air at atmospheric pressure is excluded from part, if not all, of the interface between the surface 19 and the cake 11 so that the two form intimate contact. It is believed that the binding force due to atmospheric pressure alone will give an axial attaching or bonding force which, if a complete atmospheric vacuum is obtained along their interface, is not less than the projected area of the surface 19 normal to the axis multiplied by the surrounding atmospheric pressure. The total axial attachment force may also include additional force components due to adhesion and physical interlocking of soap 11 to the adapter 18 in its peripheral soap region 11'.

It should be observed that the adapter 18 possesses a peripheral flange 86 located outwardly and upwardly from the adapter finite surface 19 such that the flange conforms to, and provides a part of, the upper contour of the combination. This provides important protection for the exposed juncture of the soap cake with the adapter flange by confining this soap-adapter juncture to a generally continuous surface, with the substantially higher, cornered surface of the inner edge of this flange being made not of soap, but of solid material. This design will also provide better protection to the combination during its shipment as well as when the upper portion of the member 17 is attached to the adapter-soap combination preparatory to its use.

It should also be observed that the general configuration of the cake is such that in the absence of a member 17, the cake can be easily grasped with the fingers extending over the peripheral rim 14. The upper surface is accommodated in the palm of the hand. Preferably, a member 17 is employed in conjunction with the cake 11 and the member 17 may include an integral or securable holding means 21.

FIG. 2 is a cross-section taken along the line 2—2 in FIG. 1. This exposes an annular face of the cake of material 11 and the round finite surface 19 of the member 17.

Figure 3:
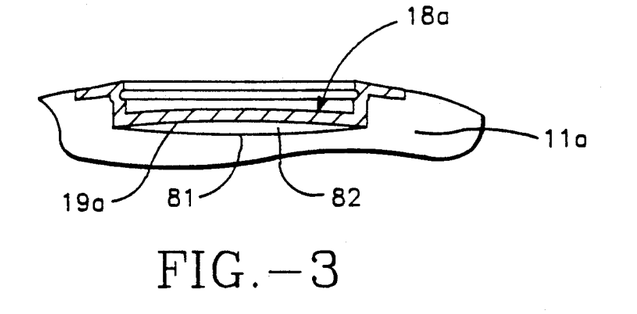
FIG. 3 is a sectional elevation view of the lower detachable portion of a member and a facing portion of soap material, which depicts a cavity between them.

Referring to FIG. 3, the finite surface 19a of the lower separable (adapter) portion 18a of the member 17 (Ref. FIG. 1) is separated from the facing surface 81 of the body of soap 11a by a cavity designated as 82. The existence of cavity 82 tends to negate the atmospheric pressure bond of attachment between the facing soap surface 81 and the adapter finite surface 19a and thus may lead to product failure, i.e. premature separation of the adapter 18a from the body of soap 11a.

Such cavity 82 may be promoted and/or created by one or more of the following conditions:

1. Improper configuration of a soap-blank (FIG. 12C, #87) that impinges on an adapter (during pressing of the combination) so as to promote the entrapment of air between them.

2. Improper configuration of the adapter 18a (e.g. a concavity) such that it promotes air entrapment during the soap pressing process.

3. Improper plastic molding resin and/or process for molding the adapter 18a such that it undergoes undesirable change of dimensions subsequent to soap pressing and promotes cavitation, and the subsequent immigration thereinto of air, water vapor, fragrance and/or other fluids emanating from the soap material 11a (and/or from outside the combination).

4. The presence of mold release lubricant on the facing surface 81 of the body of soap 11a, which impedes secure attachment of the soap material 11a to the adapter 18a.

Figure 8A:
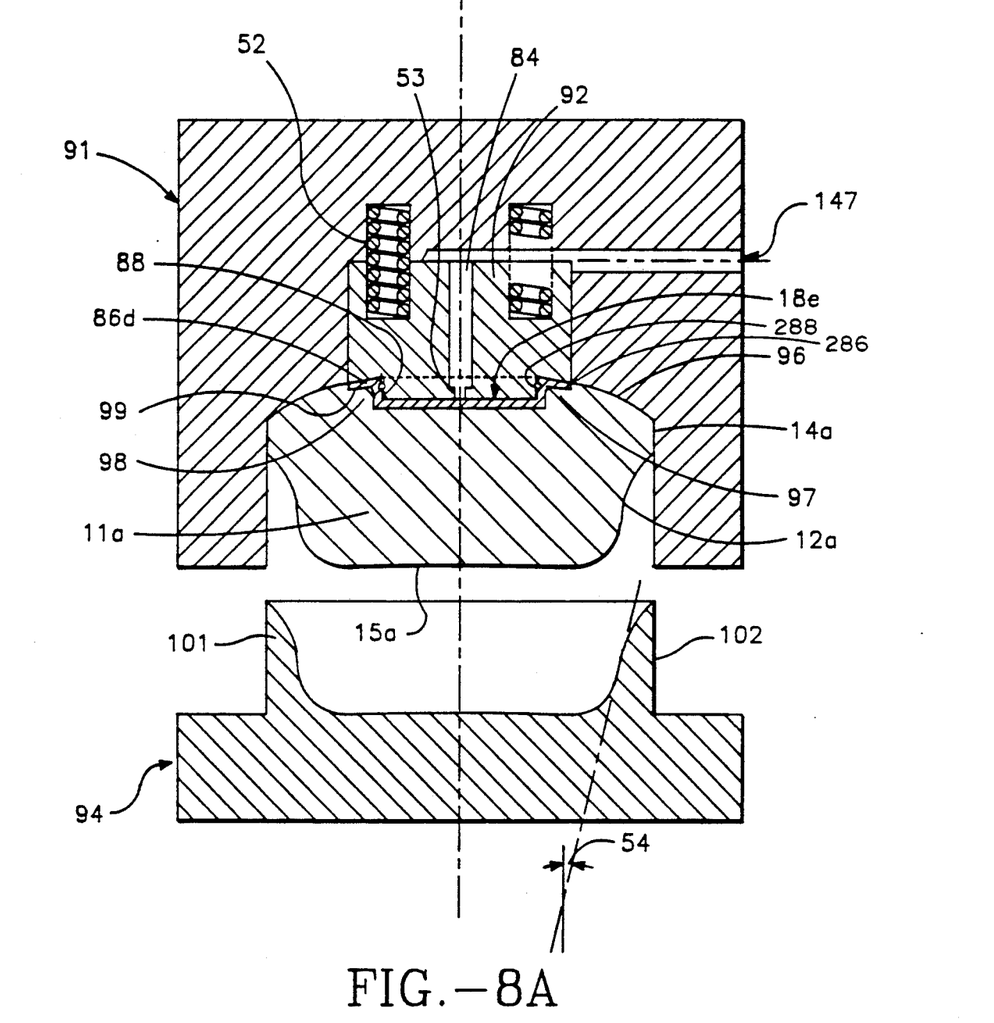
FIGS. 8A and 8B are sectional elevation views of a set of soap dies for forming subject combination in an automatic soap press, which may employ one or more matrix-dies (in sequential series) in cooperation with a punch-die, wherein said matrix-die contains an ejection pin adapted to support the lower (adapter) portion of a member.
Figure 8B:
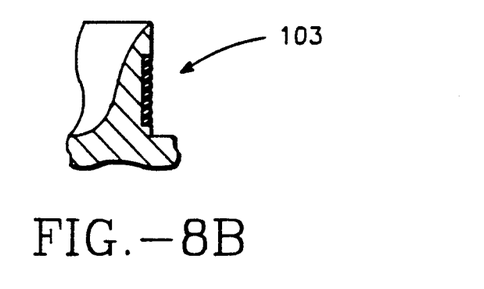

5. Improper configuration of the "adapter-supporting-surface" (Ref. FIG. 8—#18e) of the ejection pin (Ref. FIG. 8—#92) in the matrix-die (Ref. FIG. 8—#91), whose incorrect configuration may create conditions in the molded combination of soap and member (portion) such as to promote subsequent cavity 82 formation and the immigration thereinto of water vapor, fragrance, and such other fluids as may emanate from tallow and coconut oil, and from other constituents of the body of soap 11a (and possibly water or air from outside the combination). These and other conditions may contribute to cavitation and to product failure.

Figure 4:
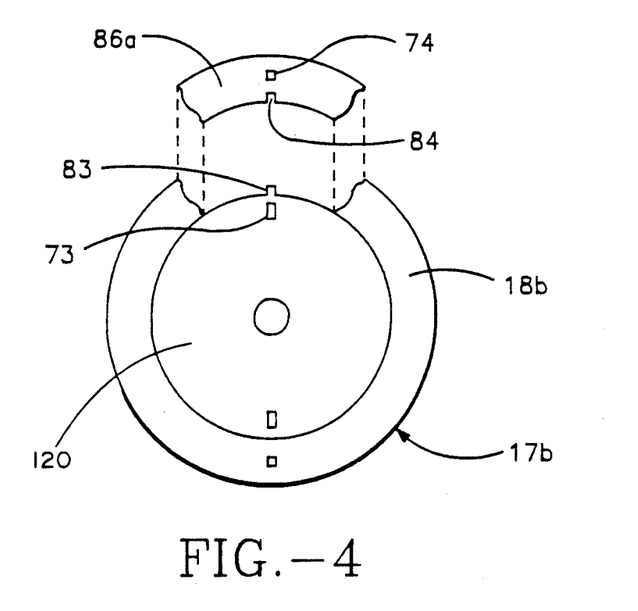
FIG. 4 is a plan view of a member consisting of two detachably securable portions that includes an exploded sub-portion of the lower separable (adapter) portion of the member, to better depict their cooperating, interlocking relationship.
Figure 5:
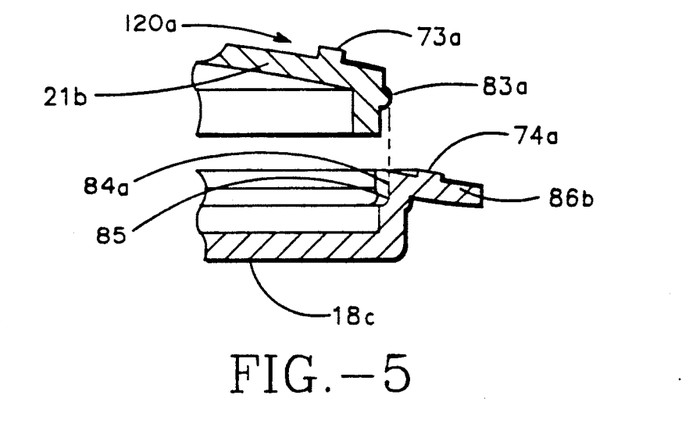
FIG. 5 is a partial view in vertical section of the two interengaging parts of the separable portions of a member, as shown in FIG. 4.

Referring to FIGS. 4 and 5, here in partly "exploded" plan-view is shown a means of attachment of the upper separable portion 120 to the lower separable portion 18b of a member 17b (which may include a holding means—Ref. FIG. 1—#21) that involves the interlocking of at least one small, outwardly extending peripheral projection 83 (and 83a ), located on the periphery of the lower portion of the upper separable portion 120 (and 120a) of the member 17b, which enters into corresponding slot 84 (and 84a) and is then turned to interlock in an interference fit, with annular groove 85 contained in the region of the inner diameter of the peripheral flange 86a (and 86b) of the lower separable portion 18b (and 18c) of the member 17b. The axial radius of the peripheral projection(s) 83 (and 83a) slightly exceeds the axial radius of the annular groove 85 so as to create an interference fit. Also shown are raised markers 73 (and 73a) and 74 (and 74a) to enable the consumer to more easily align and attach, visually or tactily, the upper separable portion 120 to the lower separable portion 18b of the member 17b. Raised marker 73 is located close to an inwardly from, an in the same vertical-axial planal radius of the small outwardly extending, peripheral projection 83. Similarly, raised marker or 74 is located close to and outwardly from, and in the same vertical axial planal radius of the inwardly facing slot 84 in the lower adapter portion 18b of member 17b.

It should be noted that any set of soap dies (e.g. FIG. 8, 9, 10, 11, and 12) that are adapted to receive an adapter with one or more raised markers 74 (and 74a) will contain an annular groove to accommodate said marker(s) in that portion of the soap die (which may be an ejection pin) that intimately supports the adapter during soap pressing.

Figure 6A:
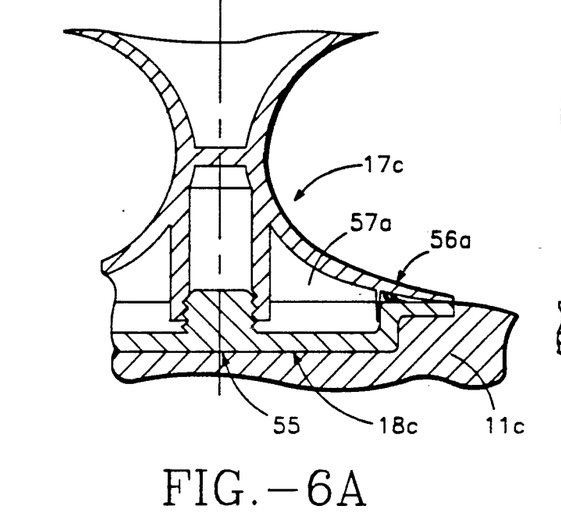
FIGS. 6A and 6B are partial views in vertical section of a member comprised of two detachably securable portions, wherein is shown their means of attachment to be located inwardly and separated from their peripheral region of non-attachment, but otherwise cooperating peripheral means of close, sealing engagement.
Figure 6B:
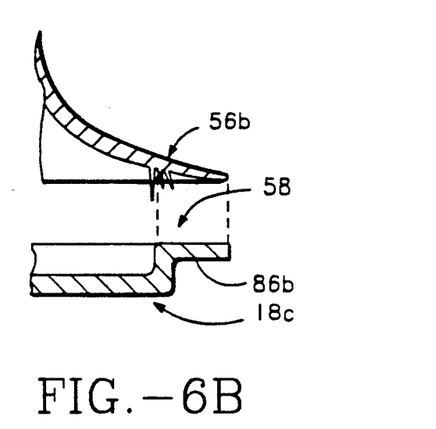
Figure 7A:
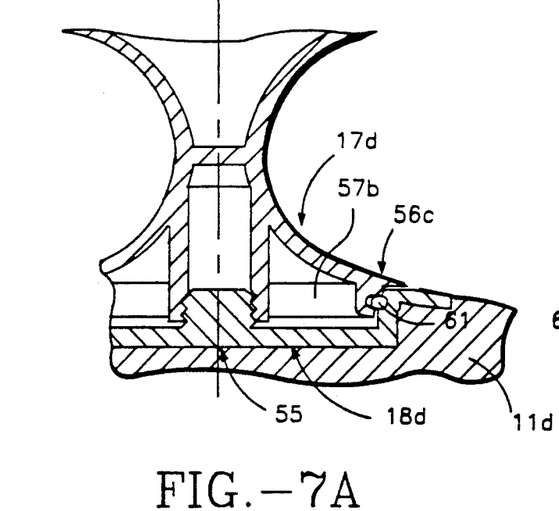
FIGS. 7A and 7B show the same relationship of the two separable portions of a member but with another means of peripheral, close, sealing engagement.
Figure 7B:
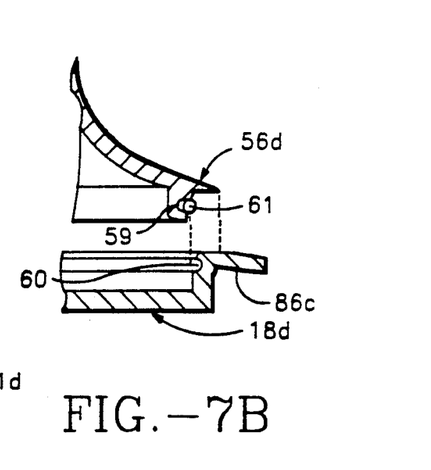

FIGS. 6 and 7 show a member designated generally as 17c and 17d respectively, having a separable base portion (adapter) 18c and 18d wherein are provided, for two separable portions of member 17c and 17d:

1. General means 55 for their attachment to, and detachment from each other, of generally unchanging difficulty, and being located subsequently inwardly from, and independent from 2. peripherally located means 56 (a–b and c–d) for preserving, by effectively sealing throughout product use, by cooperation with the peripheral region of adapters 18c and 18d, an internal buoyancy chamber 57a and 57b, separate from the outside environment, both being reasonably independent of and not being adversely affected by a. any and all distortion of the adapter (portion) 18c and 18d, imparted by excessive differential shrinkage of the body of soap 11c and 11d generally surrounding said adapter, and also b. any possible shrinkage of the adapter (portion) 18c and 18d of member 17c and 17d.

For example, sealing means 56l-b (FIG. 6) comprises several thin flexible projections located in the region of the lower periphery of the upper separable portion of member 17c, that cooperate with the outer flange region 58 of the adapter 18c so as to provide a sealed buoyancy chamber 57a. Various other outwardly located sealing means may be equally effective for this purpose, such as attained by employing other cooperating configurations of these two separable portions of member 17c.

Sealing means 56c–d (FIG. 7) includes an elastic O-ring 61 located on the lower periphery of the upper separable portion of member 17d, that cooperates in a unique way so as to maintain a continuous seal between the base portion 18d and the upper separable portion of member 17d. The special cooperating configuration of the two grooves 59 and 60 that retain the O-ring 61 as an effective seal for the buoyancy chamber 57b, regardless of differential shrinkage of the generally surrounding material 11d and regardless of any shrinkage of the base portion 18d (usually with the former substantially exceeding the latter), the resulting (partial) closure of the outer O-ring groove 60 upon the inner O-ring groove 59 merely forces the elastic O-ring farther into a generally tapered (in cross-section) inner groove 59 thereby maintaining the sealed buoyancy chamber 57b. Use of a sufficiently soft elastic O-ring should not appreciably affect the difficulty of attachment, and detachment, of this lower adapter portion 18d from the upper separable portion of member 17d.

From the foregoing, it should also be evident that a member 17, such as basically depicted in FIG. 1 as having a peripheral means of attachment of the separable portions of said member, could also be secured by use of a split wire-ring, or an O-ring of sufficiently stiff elasticity, located with a similar groove 59 (FIG. 7), for cooperation with a similar groove 60 (FIG. 7) of the detachably securable (adapter) portion 18 of member 17 (FIG. 1). It should be further evident that general means 55 for centrally attaching the separable portions of the member 17 may include such other general means of attachment such as a snap-fit, interlocking engagement, various types of screw threads, and other devices.

FIG. 8 shows a set of soap dies for pressing the adapter-soap combination, as described, which consists of one matrix-die 91 for cooperation with one punch-die 94. These dies lend themselves to forming subject combination by following special procedures, but only after having been specially designed and constructed so as to meet those requirements specific to, and peculiar to, forming subject soap-adapter combination, that will enable them to produce a final combination capable of meeting the highest standards of product performance demanded of this combination, but only by both the soap industry and the ultimate consumer but also by all marketing elements that lie between them.

The soap matrix-die 91 is depicted in section (for a preferred embodiment) with an ejection pin 92 of substantial diameter. Several features are here to be noted:

1. The adapter 18e fits on the tapered lower end of ejection pin 92, which provides a close support during the power-soap-pressing stroke of companion punch-die 94.

2. The ejection pin 92 (shown in its preferred embodiment) is of the same outside diameter as the adapter 18e so that on ejection, the lower outer edge of this pin can leave no disfiguring "edge-mark" on the soft soap cake 11a, as it might if this pin were of greater diameter than that of the adapter. Also, this preferred embodiment prevents possible distortion of the adapter and damage to the pressed soap cake 11a that might occur if the diameter of the ejection pin were substantially less than that of the adapter, which might permit the adapter to flex on ejection.

3. The adapter 18e is provided with an outwardly extending flange 86d (also see FIG. 1) that will form a significant conforming portion of the upper contour of the combination. This provides several advantages:

(a) The greater height of the inner edge of adapter flange 86d will protect the lower, exposed junction 286 of soap with the outer edge of the flange during shipment from possible buffeting and during product preparation for use by the consumer (which includes attachment of the upper member portion and a holding means).

(b) This will improve its soap-wear characteristics by maintaining a wider, slower wearing region 97 of the soap cake 11a located generally outwardly from the adapter 18e. This in turn helps to maintain approximately a constant area of the bottom soap surface 15a while this surface of application wears down in use all the way up to the bottom surface of adapter 18e.

(c) And if the outer periphery of the adapter conforms in intimate contact with the supporting surface of the ejection pin (and/or other internal matrix-die surfaces), the flange 86d will permit effective obturation during soap pressing, such that the pressure of the fast advancing soap material into the upper region 98 of the matrix-die cavity on closure of the punch-die 94, will exert such pressure on the underside 99 of this flange 86d as to seal it tightly against the upper supporting ejection pin (and/or other internal matrix-die surface), thus preventing any soap from being forced up and over the top of the flange during soap-pressing, this effectively preserving the acceptable appearance of the final soap combination.

(d) The flange 86d provides extra overall width to the adapter which in turn allows use of a wider diameter ejection pin having the same diameter as the adapter. Thus, the upper soap surface 96 located outwardly from the flange 86d and above the rim 14a of the combination, is substantially reduced in area and thus offers less total adhesion resistance to ejection of the combination from the matrix-die without product distortion or other damage. (Also, this reduced adhesion resistance to ejection may obviate need for application of mold release lubricant to this die, at least for some soap compositions, or some die surfaces.)

(e) It will further improve the saleable, merchandised appearance of the final product (i.e. the combination of the cake of soap with attached adapter, which will make up the bulk of anticipated future sales as "refills") to those consumers who already possess separable holding means and wall brackets for supporting subject combination.

4. The configuration of the matrix internal die-wall located outside the adapter gives final shape to the upper soap surface 96 and the adjoining side-rim 14a of subject combination.

5. It should be observed in FIG. 8 that attachment means 288 may be employed in order to secure adapter 18e to the adapter-supporting protuberance 289 in a soap die (which may be an ejection pin 92) to facilitate pressing the combination, and from which protuberance the combination may be removed at "take-off" of the completed combination.

In a multiple-station soap press, ejection of the combination should only occur at the take-off station. Thus, such activation of the ejection pin 92 at the desired station in the soap press, may be accomplished by, or initiated by, a fixed cam acting against rollers, or by other means. A spring-loaded (52) ejection pin 92 might be usefully employed here providing these springs are only strong enough to assist ejection *after* initial "breakaway" of the combination from the matrix-die is initiated by other means, at (or when closely approaching) the take-off station.

If adapter 18e is given sufficient taper (88), it should release more easily from the ejection-pin and could also be placed more easily on said pin by automatic feed mechanism. However, if need be, instant release may be aided by mechanical separation "linkage" of the adapter from this pin. Or, air-pressure may be used for this purpose. In this event, the amount of pressurized air shot into the space between the adapter and the ejection pin may, in effect, be "controlled" by use of a choke 53 that partially obstructs air passage within the ejection pin. This may permit better control of the ejection process and removal of the combination from the soap press by forcing extension of the ejection pin before sufficient air-pressure can lift the combination off this pin into a vacuum-cup or directly onto an out-conveyor.

Ease of ejection may be improved by not over-polishing that portion of the ejection pin that interfaces with the adapter. This may permit more rapid penetration of air into and along this interface after pressing the combination.

FIG. 8 also shows a punch-die 94 that stamps the soap-blank (Ref. FIG. 12, #3–87) into the configuration of the finished combination while at the same time attaching the body of soap 11a to the adapter 18e. The punch-die 94 determines both the shape of the side surface 12a of the soap cake beneath the rim 14a, and the bottom soap surface 15a. The significant draft angle 54 of the side surface 12a beneath the rim 14a should facilitate separation of punch-die 94 from the soap body, which withdrawal may be further facilitated by lubrication of this punch-die before each stroke. (If needed, but as appears unlikely, a spring-loaded or other actuated ejection pin could be incorporated into this punch-die to facilitate soap release—even by solenoid.)

If it is found that portion 101 (ref. FIG. 8) of the punch-die 94 that thrusts deep into the matrix-die to form the undercut surface 12a of the soap combination should in any way become distorted in normal use, if a suitable stronger material cannot be found to prevent this distortion, the side surface 102 of the punch-die may be undercut and wound with high-tensile strength wire under substantial tension, as depicted in 103 to rectify this problem.

Although a single set of matrix/punch dies may function reasonably well on a pin-die press, this basic die combination lends itself to automatic press operation that uses a single punch-die 94 in cooperation with a plurality of matrix-dies 91 that are indexed progressively to a series of stations according to function (e.g. ref. FIG. 12 and related discussion).

Figure 9:
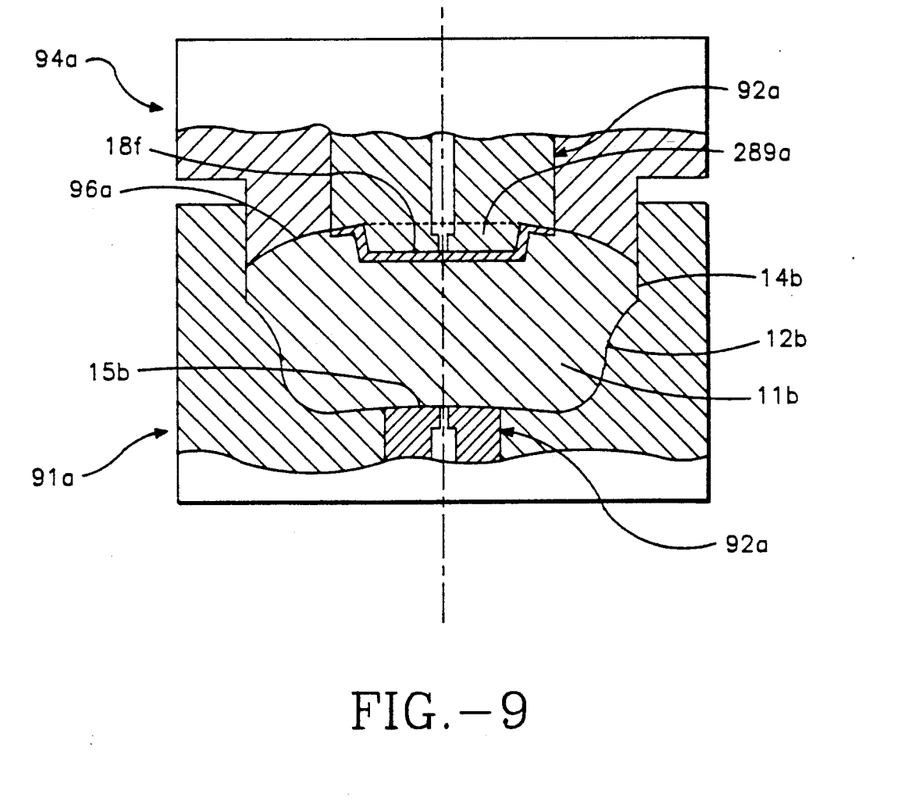
FIG. 9 is a sectional elevation view of a set of soap dies for forming subject combination in an automatic soap-press, which may employ one or more matrix-dies (in sequential series) in cooperation with one or more punch-dies (also in sequential series) wherein said punch-die contains an ejection pin adapted to support the lower (adapter) portion of a member.

FIG. 9 shows another pair of matrix-punch dies to produce the same adapter-soap combination, as described. The principal difference here is that the punch-die is adapted to receive and to support the adapter 18f during pressing of the combination. To accommodate this change, the matrix-die not only forms the soap side surface 12b below the rim 14b and the bottom soap surface of application 15b, but also forms the soap side-rim 14b. One advantage of this design is that the overall depth-dimension of the two dies combined could be substantially less than for the two dies depicted in FIG. 8, where the internal die-wall of the matrix-die that forms the side-rim needs to be extended in order to provide sufficient depth of cavity to receive the soap-blank. But for the matrix-die in FIG. 9, the die-cavity already possesses most of the depth needed to receive the soap-blank.

However, whereas the matrix-punch-die combination according to FIG. 8 reduces the punch-die to a single operation, with the matrix-die performing a plurality of sequential operations, according to the disclosure of FIG. 9, both dies would be required to perform multiple operations—this unnecessarily complicating the soap press. Further, an ejection means may be needed for each die, this further complicating this design of soap press. Yet, it may remain a viable alternative method for production of subject soap-adapter combination.

Figure 10:
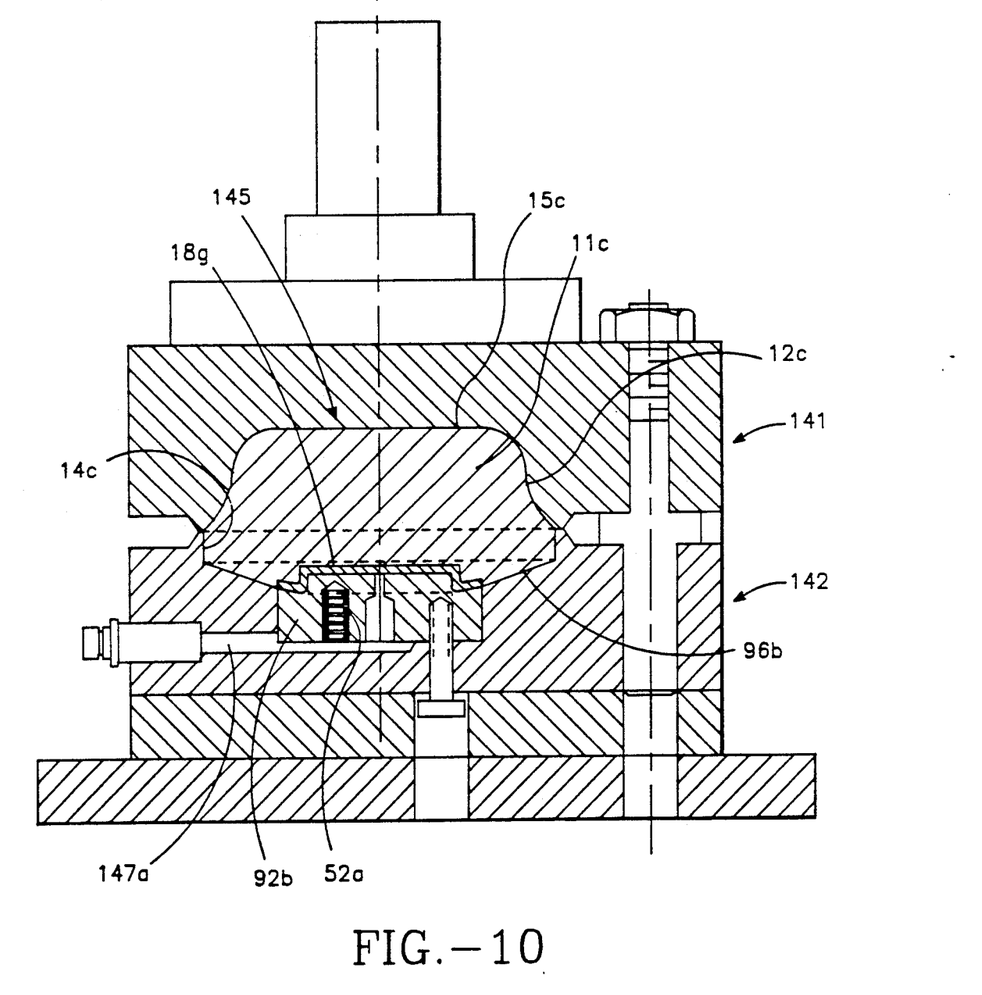
FIG. 10 is a sectional elevation view of a set of shell-dies for forming subject combination on an automatic pin-die soap-press, which may include a plurality of sequential stations.

FIG. 10 depicts a set of soap dies (in section) to produce the soap-adapter combination, as described. The lower die 142 contains ejection pin 92b, which receives adapter 18g, which it intimately supports during soap pressing. The preferred embodiment of the ejection-pin 92b is of the same diameter as that of the adapter 18g. In addition to supporting adapter 18g during soap pressing (by means of ejection-pin 92b), the lower die 142 is also designed to impart final configuration to the soap surface 96b outwardly adjacent to said adapter and to its side-rim 14c. Upper die 141 is designed to impart both the major surface 15c of soap application and the side surface 12c that joins the major surface of application to the side-rim 14c. The ejection-pin 92b may be provided with ejection springs 52a to facilitate ejection of, and removal of, the completed combination 145 after soap pressing. Optionally, lower die 142 may be provided with inlet hole 147a to permit use of air-pressure to further facilitate ejection-pin function as well as separation of the combination from the ejection-pin. (Ref. FIG. 8—147) Such a single set of soap dies may be used on a standard type of pin-die soap press. Also, a single upper die 141 may be used with a plurality of lower dies 142 that are indexed according to desired automatic press function. (Ref. FIG. 12 and related discussion)

Figure 11:
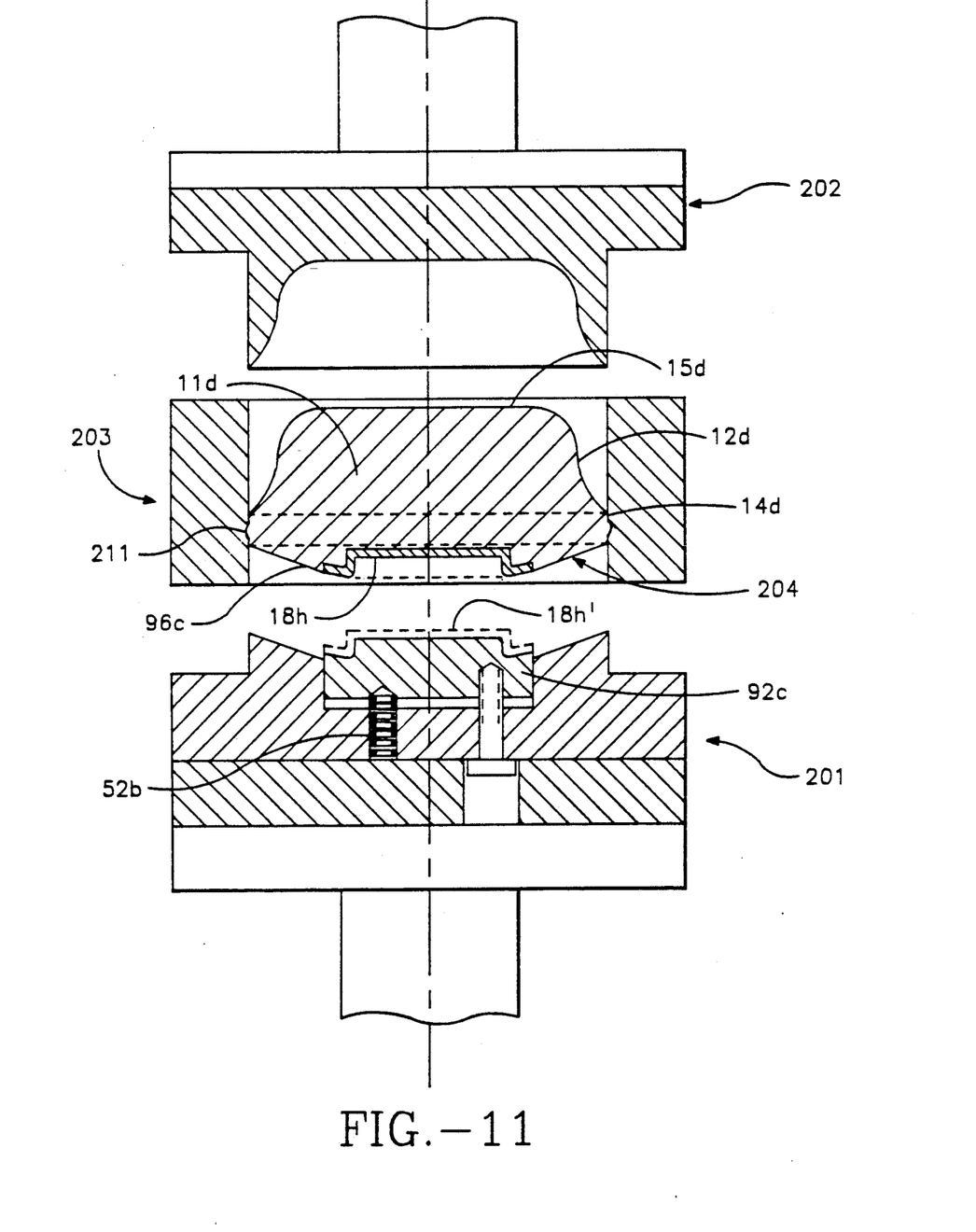
FIG. 11 is a sectional elevation view of a set of soap dies for forming subject combination in an automatic soap-press, which may employ one or more barrel-dies (in sequential series) in cooperation with two opposing, converging punch-dies, one of which may include an adapter supporting ejection pin (which die may itself be progressed in a separate sequential series).

FIG. 11 depicts a "barrel-die" in section, comprised of three basic elements (201, 202, and 203), for forming the soap combination, as described. (This is generally similar in concept to the conventional high-speed, multi-station "box-press" now widely used by the industry but with significant modifications to accommodate the pressing of subject combination.) Whereas the peripheral configuration in plan-view of most standard soap bars is that of a rectangular box, the same view of subject adapter-soap combination is generally that of a circle, or modified circle, such as the end of a "barrel". To clarify this basic difference in planview configuration, the term "barrel-die" has been adopted as a general name for this unique type of soap die.

The barrel-die shown (in FIG. 11) is comprised of a set of two opposing punch-dies (201 and 202) that converge and act upon a soap-blank within the central die-barrel 203, to form the aforedescribed adapter-soap combination 204. Punch-die 201 is adapted to receive and to intimately support adapter 18h (here shown on the ejection pin 92c as 18h') during the soap pressing operation, thereby attaching said adapter to the body of soap while at the same time forming that soap surface 96c located outwardly from the adapter 18h, while opposing punch-die 202 is adapted to form the side-surface 12d of the pressed soap cake between the side-rim 14d of the combination and the soap surface of application 15d The side-rim 14d is formed by the barrel-die 203.

Figure 12A:
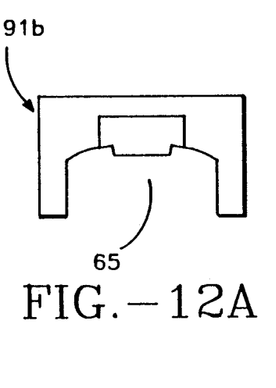
FIGS. 12A through 12E depict a series of operating stations, in schematic cross-section, for an automatic, high-speed soap-press for forming subject combination. (shown here is a single punch-die for cooperation with a plurality of matrix-dies.)
Figure 12B:
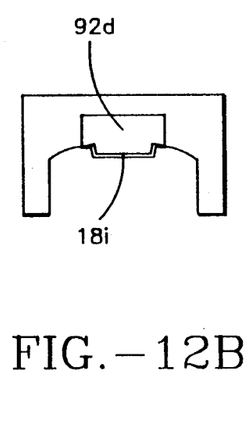
Figures 12C, 12D:
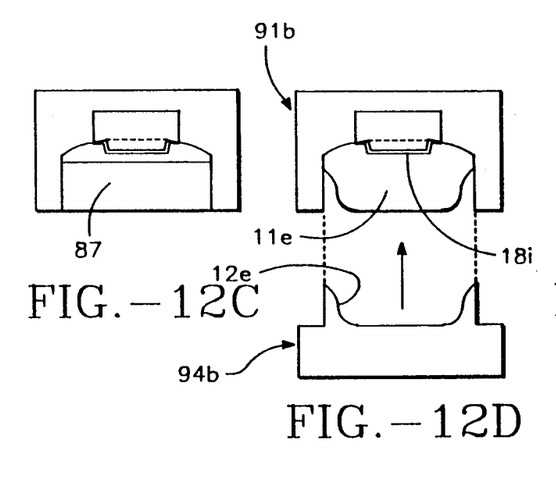

As an aid in holding the soap-blank (ref. FIG. 12—3: #87) and the pressed adapter-soap combination 204 in place within the die-barrel during progression of the barrel to sequential stations, the die-barrel may contain an internally facing, generally peripheral groove 211 into which the soap material may be pressed so as to interlock more securely within the barrel. Then when this combination is forcefully ejected from the barrel at the take-off station, the act of ejecting the combination smooths out this sidewardly protruding soap projection into a (vertical) straight side-rim profile.

The basic type of industry high-speed, automatic box-press is comprised of a series of four centrally positioned, rectangular, open-ended die-boxes that rotate within two opposing, simple forming punch-dies that converge on a pre-lubricated soap-blank located within the central box-die, to form the century-old industry standard type of soap bar. (It is standard practice to lubricate each soap-blank before it reaches the die-box in order to prevent frequent production of "soap rejects". Bar soap composition has a strong tendency to adhere to the soap-dies, this leaving an unacceptable "torn cavity" in the new soap bar. When this occurs, every succeeding bar usually perpetuates a similar defect, which necessitates shutting down the soap production line to manually clean the dies before restarting production. And all the rejects must be found and recycled. Also, the soap-blank lubrication system must then be checked to make certain that it is functioning properly.)

In contrast, This new automatic barrel-press is adapted to receive, and to advance, the lower separable portion of a member 18h' (adapter) mounted on a conforming surface of punch-die 201, into position to cooperate with opposing and converging punch-die 202, with both dies acting upon a non-lubricated soap-blank located within barrel-die 203 positioned between them, to form the adapter-soap combination 204—while imparting lubrication to the soap and die interface, yet at the same time preventing lubrication occurring anywhere along the soap-adapter interface. (How this problem was solved is described below.)

Automatic, high-speed operation of this new type of "barrel-press" may be appreciably facilitated, and higher-speed operation thereby attained, if a plurality of punch-dies 201 are themselves independently adapted to sequentially rotate thru multiple sub-stations so as to bring one new adapter 18h' at a time, mounted on an internal conforming surface (which may be an ejection pin) into soap-pressing position (while another identical punch-die 201 advances to a sub-station to be lubricated, and thence to another sub-station to receive a new adapter 18h' preparatory to pressing a succeeding soap-adapter combination) as prerequisite to forming the combination in cooperation with punch-die 202 and barrel-die 203, each time said die-barrel is advanced to its next station, which at the same time advances a successive punch-die with adapter mounted on its conforming surface, ready to form another soap-adapter combination. When pressing the combination, punch-die 201 may be activated by a fixed ram, solenoid, or other means. Automatic means may be employed to place the adapter onto the conforming die-surface (which may include an ejection pin) of punch-die 201.

Reference is made to FIG. 12 and the multi-station method it portrays, in schematic sequence, for forming the combination of a body of soap 11e and a member (portion) 18e attached thereto, in an automatic soap press of special design that includes five matrix-die stations, in rotary sequence located at 72° angular intervals, as may be progressed by a dog-Geneva movement, that performs the following functions, in cooperation with a single punch-die 94b, using dies especially designed for forming subject soap-adapter combination. (Also refer to FIG. 8.)

Station #1—Mold release lubricant may be applied to empty matrix-die 91b cavity 65 here, (e.g. By spraying, misting, direct application, etc.)

Station #2—Adapter 18i is placed by automatic means onto conforming die surface (here shown as ejection pin 92d) of matrix-die 91b, which may be spring-loaded and extended (ref. FIG. 8—53 and FIG. 10—52a). (Also ref. FIG. 12—5: #92d). If adapter cannot be relied on to remain attached to ejection pin by force-fit and/or gravity, more direct attachment means may be employed for such purpose, such as previously defined.

Station #3—A soap-blank 87 (pre-cut to size) is here automatically introduced into the matrix-die, within which it may be held securely in place by force-fit, by soap interlocking, or by other means, as previously described.

Station #4—Punch-die 94b is driven into matrix-die 91b (a) to attach the body of soap 11e to the adapter 18i, and (b) to give final form to the combination. The generally tapered die side-surface 12e should facilitate release of the punch-die from the combination (which remains in the matrix-die until the next station). Mold release lubricant may here be applied to the punch-die after its withdrawal from the matrix-die, during progression of the multiple matrix-dies to their next stations.

Figure 12E:
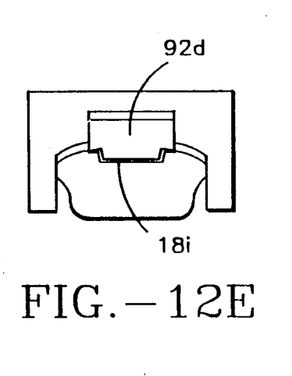

Station #5—Here the ejection pin 92d performs primary ejection of the combination from the matrix-die. This ejection may be assisted by air-pressure applied to the base of the ejection pin, or this may be accomplished by cam and rollers or other means. However, if adapter 18i should tend to stick to the ejection pin 92d, then air under pressure may be led thru a passage (FIG. 8—84) in the ejection pin, against the interior surface of the adapter that faces the pin, to effect final release of the combination from the pin 92d for take-off. However, sufficient taper (FIG. 8—88) given to the side-wall of the adapter and its supporting protuberance should eliminate need for such assistance.

The body of material to be attached to the member (or separable adapter portion thereof) may be of various erodable materials such as soap (including synthetic detergents), wax, heavy lubricants, rubbing compounds, etc. It should be clear that whereas a complete member may be attached to such body of erodable material, both automatic production and economic considerations strongly favor that only the adapter be attached to most combinations that find their way into the mass-market.

As pointed out previously, many serious problems were encountered when development testing experimental product samples, many of which failed to maintain secure attachment of the adapter to the body of soap—either at time or attachment of the upper separable portion of the member to the adapter, or during product use. As a result of lengthy investigations including repeated product testing, several different causative factors were found to be responsible for this serious problem, any one of which, or any combination of which, spelled malfunction. Not the least of these was finally found to be the use of pre-lubricated soap-blanks (e.g. with glycerine, saline solution, etc.), as is standard practice in the soap industry. It thus became necessary to discover how such lubrication could be maintained between the soap-blank and the die-surface while at the same time being prevented from reaching the soap-adapter interface.

Whereas the preferred embodiment of subject soap-adapter combination is that of a solid of revolution, it should be recognized that this basic configuration of revolution may be generally adhered to even with variations in this product form, such as with multi-sided soap bodies of six, eight, or other number of sides. Thus, various soap surfaces may be effectively employed such as fluted, scalloped, flat, curved, etc. However, configurations of "non-revolution" may also be marketed successfully, such as a soap cake of generally triangular planform with truncated corners. Similarly, the member and holding means may employ attractive surface variations as long as they do not detract from their basic function and as long as they are comfortable in use.

What is claimed is:

1. An apparatus for producing a body of soap of a size to be grasped and manipulated in a hand, said body having a bottom surface, a side surface extending upwardly from the bottom surface, a side rim extending outwardly from the side surface and having a side rim surface, and an upper surface with a generally cup-shaped adapter embedded therein, the adapter including a horizontally extending base, a wall extending upwardly from the base, and a flange extending outwardly from an upper end of said wall, said apparatus comprising at least a first die and a second die together defining a cavity for forming said body of soap, the first die including an ejection pin having a ledge adapted to engage against the adapter flange, and an end projecting downwardly from said ledge, said projecting end having a smaller diameter than said ledge to permit said end to project within said adapter against said base, the first die further including an outer die portion having a surface aligned with and extending outwardly from the ledge to form, together with said ledge, the upper soap body surface, and means for moving the pin inwardly relative to the outer die portion to eject a molded soap body therefrom, said second die including an inner side die surface tapering downwardly and inwardly from a diameter generally equal to the outer diameter of the die surface of the outer die portion to a lesser diameter at a bottom surface of said second die for forming the soap body bottom surface, whereby soap material is forced directly upwardly toward the adapter flange thereby securely obturating the flange against the first die.

2. The apparatus of claim 1, wherein the first die includes a first rim portion having a side rim die surface for forming the side rim surface of the soap body, and the second die includes a second rim portion extending upwardly from the bottom surface thereof and defining said inner side die surface, said first rim portion abutting against said second rim portion.

3. The apparatus of claim 1, wherein the first die includes a first rim portion having a side rim die surface for forming the side rim surface of the soap body, and the second die includes a second rim portion extending upwardly from the bottom surface thereof and defining said inner side die surface, said second rim portion being slidably received within said first rim portion.

4. The apparatus of claim 1, wherein the second die includes a rim portion extending upwardly from the bottom surface thereof, said rim portion defining said inner side die surface and a surface for forming the side rim surface of the soap body, said first die being slidably received within said rim portion.

5. The apparatus of claim 1, further comprising a third die disposed between said first and second dies, said third die having a rim portion defining a surface for forming the side rim surface of the soap body, said first and second dies being slidably received within said rim portion.

6. The apparatus of claim 5, wherein the surface for forming the side rim surface of the soap body includes an outwardly extending lateral groove into which soap material is pressed and interlocks during pressing of the soap body to form a lateral soap projection, said soap projection being eliminated upon forcible ejection of the body from the third die.

* * * * *